United States Patent [19]
Dailey

[11] 4,192,203
[45] Mar. 11, 1980

[54] VARIABLE GEAR RATIO TRANSMISSION

[76] Inventor: Alvin Dailey, 4527 New Hampshire Ave., NW., Washington, D.C. 20011

[21] Appl. No.: 874,243

[22] Filed: Feb. 1, 1978

[51] Int. Cl.² ............... B60K 41/18; F16H 5/06; F16H 3/74
[52] U.S. Cl. .................... 74/863; 74/337.5; 74/793; 74/752 A
[58] Field of Search ............. 74/751, 793, 802, 773, 74/789, 753, 863, 337.5, 752 A, 752 C

[56] References Cited
U.S. PATENT DOCUMENTS

| | | | |
|---|---|---|---|
| 1,299,629 | 4/1919 | Snider | 74/793 |
| 1,370,047 | 3/1921 | Rogers | 74/751 |
| 1,804,055 | 5/1931 | Herrmann | 74/773 |
| 2,292,079 | 8/1942 | Joyce | 74/751 |
| 2,384,996 | 9/1945 | Hanson | 74/773 X |
| 2,624,215 | 1/1953 | McRae | 74/677 |
| 3,008,341 | 11/1961 | Cobb | 74/472 |
| 3,121,483 | 2/1964 | Lietz | 74/863 X |
| 3,240,083 | 3/1966 | Stoddard | 74/758 |
| 3,876,342 | 4/1975 | Dailey | 718/36 |
| 4,023,442 | 5/1977 | Woods et al. | 74/863 |
| 4,080,847 | 3/1978 | Thomas | 74/751 |

*Primary Examiner*—Lance Chandler
*Attorney, Agent, or Firm*—Bernard & Brown

[57] ABSTRACT

A constant meshed, infinitely variable gear ratio transmission using relatively low pressure, low volume hydraulic systems to control the transmission gear ratio. The transmission includes a gear box having an input and output shaft. The gear box houses two sets of planetary gears which couple the input and output shafts together. A pinion gear is fixed to each shaft. A set of planetary gears mesh with each pinion and a plurality of planetary gear shafts connect the corresponding planetary gears of each pinion together. A cage is rotatably supported in the housing. A first hydraulic system controls the rotation of the cage. A second and independent hydraulic system controls the rotation of the planetary gear shafts by selectably controlling the rotation of the cage and the rotation of the planetary gear shafts so that the gear ratio for the transmission may be intermediately selected.

11 Claims, 4 Drawing Figures

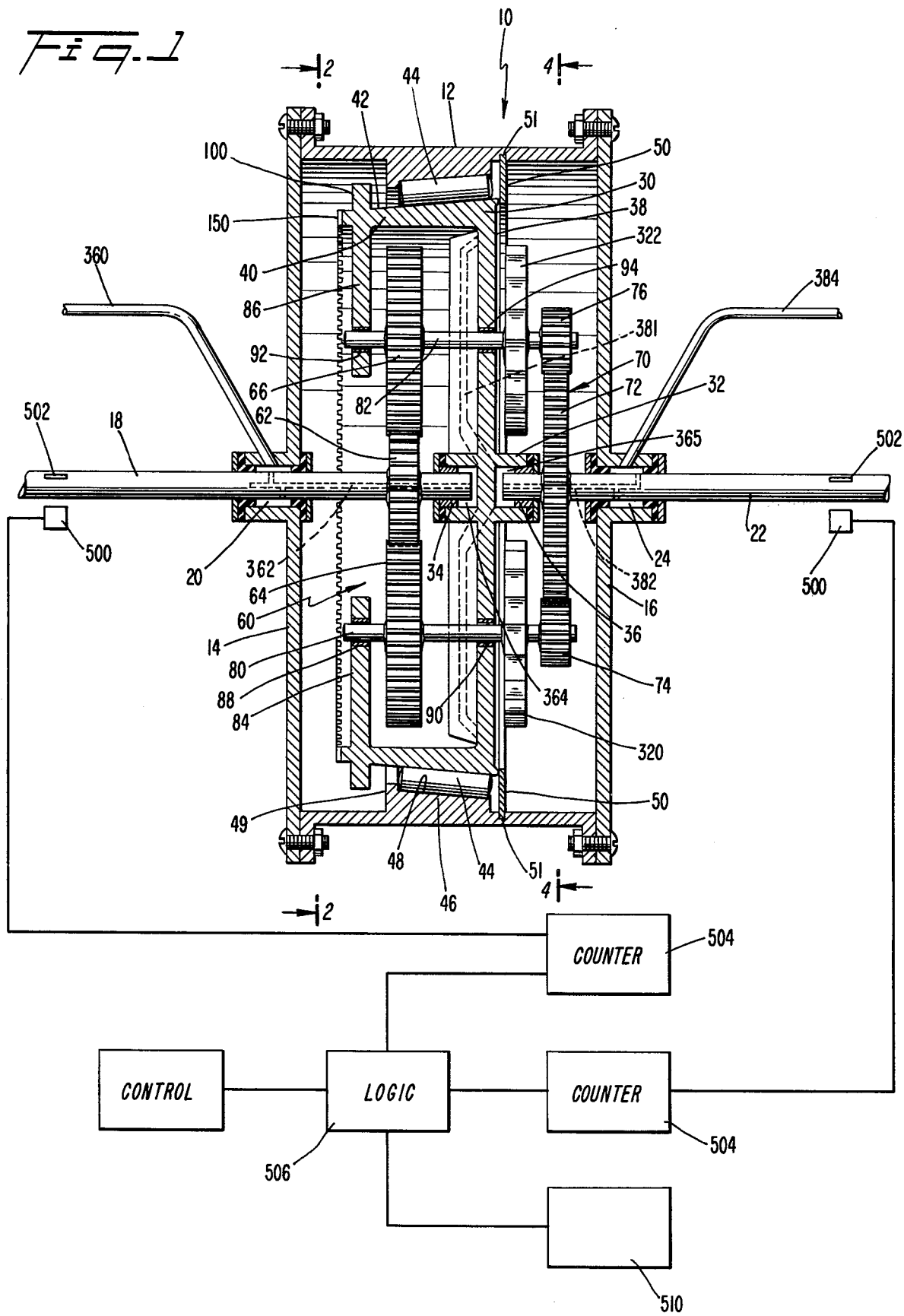

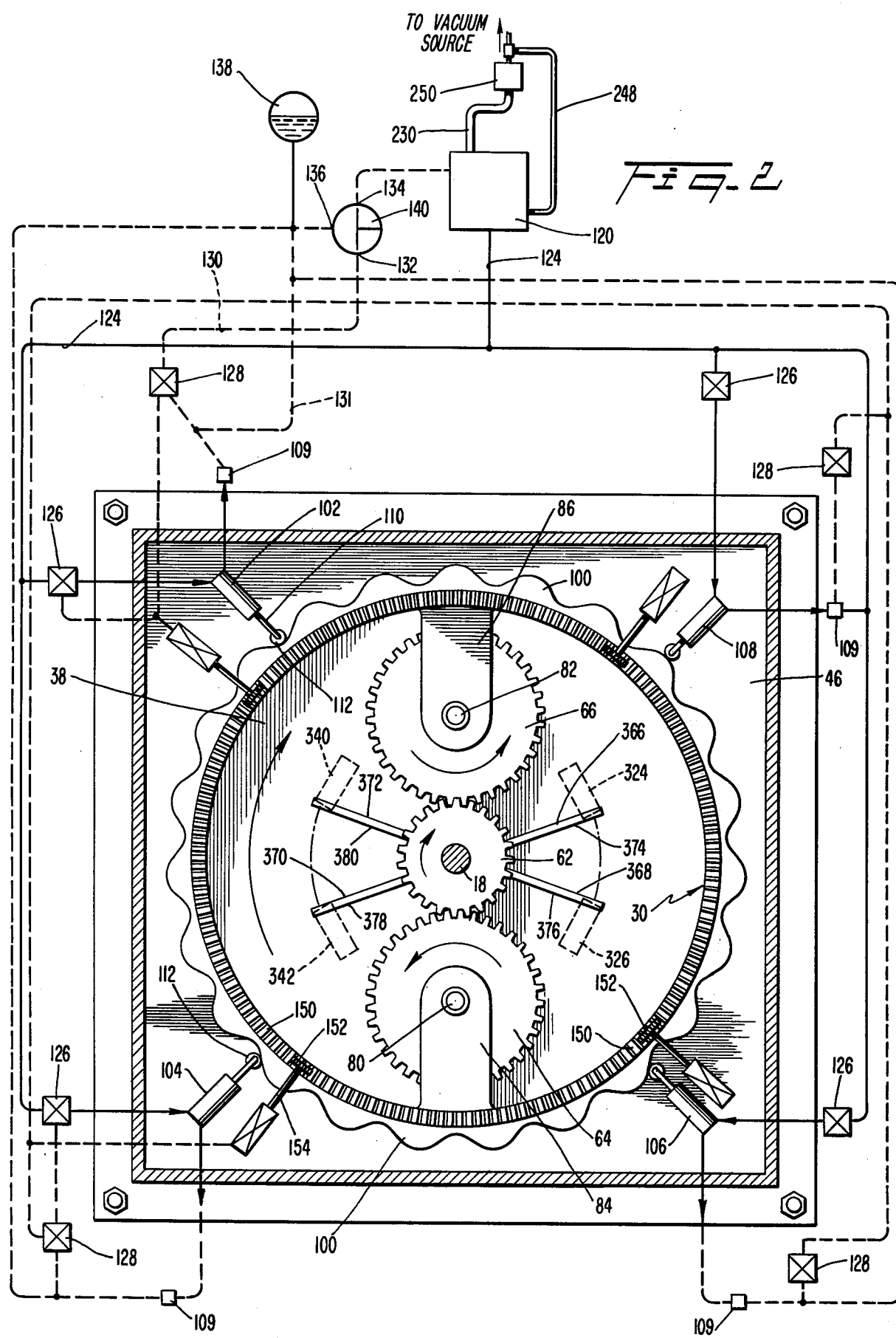

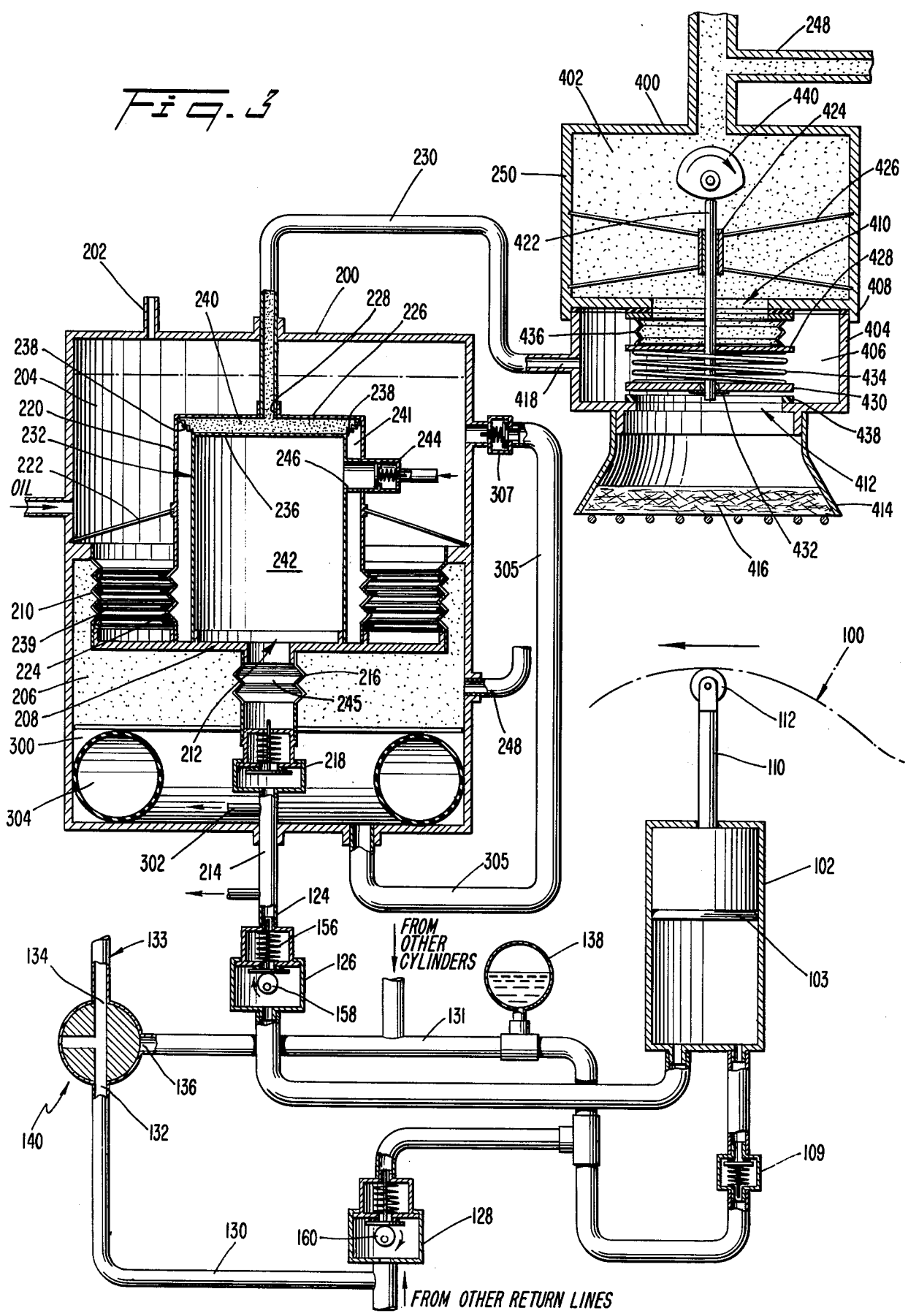

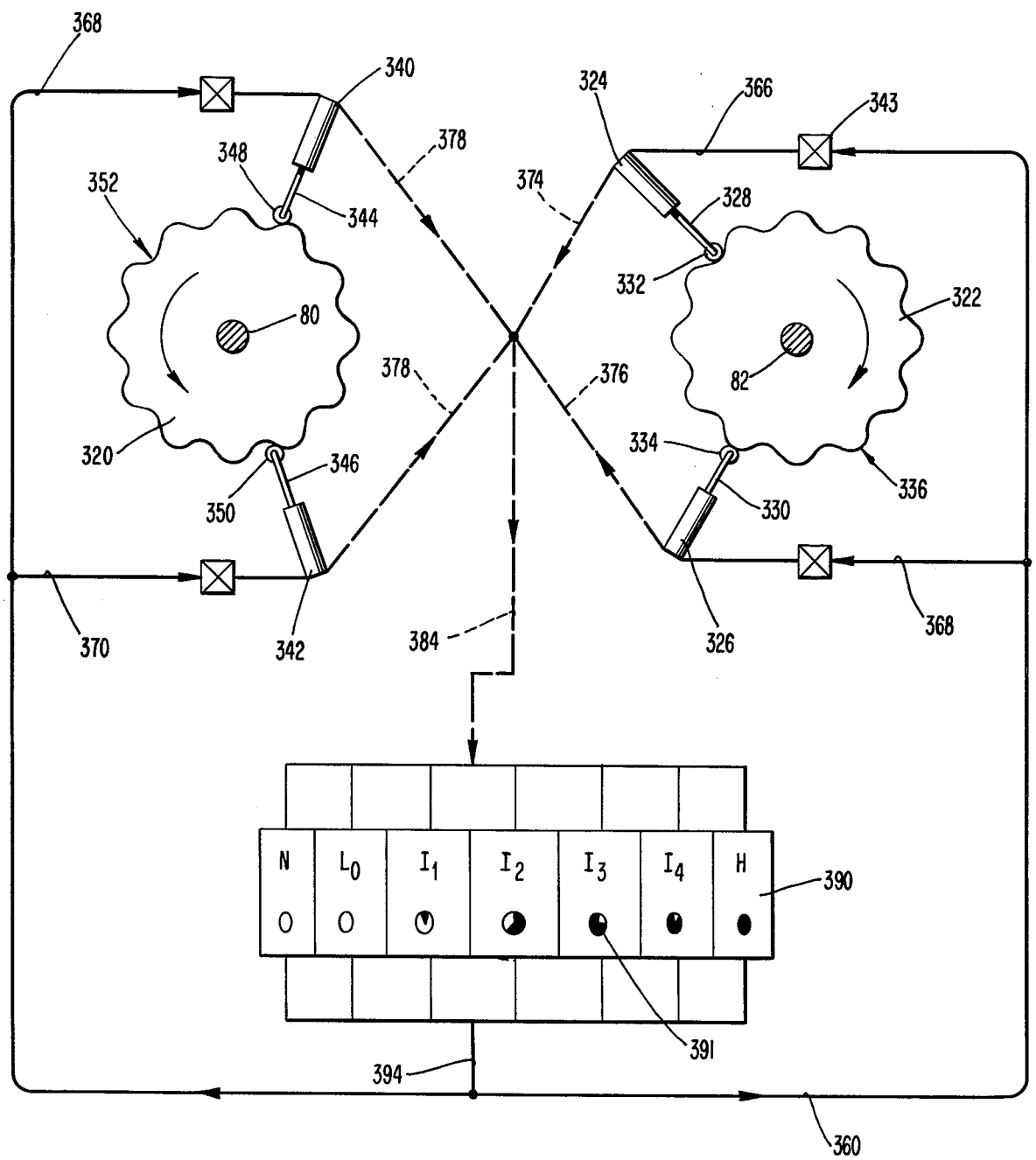

VARIABLE GEAR RATIO TRANSMISSION

BACKGROUND OF THE INVENTION

The present invention relates to a transmission and more particularly to a constant mesh variable gear ratio transmission spanning the range from a low gear ratio to direct drive.

Transmissions have been used for many years in a variety of environments including automobiles, trucks and other moving vehicles when a variety of gear ratios is required. Hydraulic transmissions typically utilize fluid couplings to connect an engine drive shaft to a transmission output shaft. Fluid couplings typically experience significant energy losses. Oil or other hydraulic fluid with which the coupling is filled is directed from an impeller driven by the engine between the vanes of a turbine. The oil drives the turbine at an increasing speed until the turbine rotates at the same speed as the impeller. Although a fluid coupling can provide a smooth takeup so that the vehicle moves off without jerking, a significant amount of energy can be lost in this fluid coupling.

Hydraulic tranmissions typically also include two planetary gear sets employing a centrally mounted pinion and one or more planetary gears which engage with the pinion and with the teeth on the inside of an annular ring gear commonly known as an annulus. The transmission of force through the transmission is accomplished by the planetary gear sets and the fluid coupling. A specific number of pre-determined stepped gear ratios are typically provided by using friction clutches to selectively lock the sun gear, the annulus or the planet gears separately or in various combinations. There can be additional energy losses in the friction clutches used to control the motions of these various gears. An example of this type of transmission is shown in U.S. Pat. No. 2,624,215 to McRae. It is apparent that transmissions using fluid couplings and friction clutches can be inefficient and complicated to manufacture and maintain. Because they also tend to be large and heavy and inefficiently consume power, they are not well suited for use in the more compact lightweight automobiles that are becoming more and more prevalent. Furthermore, because of the energy losses experienced in such transmissions, it is often difficult to match the most feasible gear ratio to the horsepower output of the engine and the applied load.

Large and inefficient transmissions would tend to overtax the smaller engines that are presently used more and more frequently and, thus, significantly reduce engines efficiency and increase gasoline consumption.

One such new lightweight and efficient engine is disclosed in my U.S. Pat. No. 3,876,342. There is a need for more efficient transmissions that will be more compatible with such new engines. The more efficient use of energy, the weight and material savings resulting from the use of the engine and transmission will have a cumulative similar effect in the vehicle in which they are installed.

Some transmisson mechanisms use hydraulic systems rather than friction clutches to control the motion of various elements of their planetary gear sets to provide different gear ratios; see for example U.S. Pat. Nos. 3,008,341 to Cobb and 3,240,083 to Stoddard.

The elimination of friction clutches may increase the efficiency of the transmission somewhat but the use of large amounts of hydraulic fluid, sometimes under high pressure, to operate these systems is a further source of transmission inefficiency.

SUMMARY OF THE INVENTION

The present invention provides a constant meshed, infinitely variable gear ratio transmission which is efficient and lightweight. No fluid coupling is used. Friction clutches are replaced by hydraulic systems which operate at relatively low pressures and use relatively small quantities of hydraulic fluid.

A unique feature of my transmission is that of augmenting a lower gear ratio with a higher one to give a series of summarized single intermediate gear ratios at the drive shaft that numerically span from a preselected low gear ratio to a direct through one to one drive. Since gears are in constant mesh, no intermediate coupling need be interposed to ensure smoothness of shifting.

The transmission includes a gear box into which are journalled an input and an output shaft. A plurality of planetary gear sets couple the shafts together an include a pinion gear on each shaft, a set of planetary gears meshing with each pinion gear, and a plurality of planetary gear shafts connecting the corresponding planetary gear of each pinion together. A cage is rotatably supported in the housing and supports each planetary gear shaft.

A hydraulic circuit is provided for controlling the rotation of the cage. A second and independent hydraulic circuit is provided for controlling the rotation of the planetary gear shafts. The first hydraulic circuits include a pump which energizes a series of rotation retardation cylinders which house pistons whose movement is controlled by the hydraulic system. Piston rods connected to each piston engage a cam surface on the cage in a suitable manner such as a roller which is employed with this device. The first hydraulic circuits requlate the back pressure on the piston to control the force with which the piston rod is pushed against the cam surface. Usually four rotation retardation cylinders are disposed around the periphery of the cage in such a location that at least one cylinder would be acting to achieve rotation retardation of the cage when such would be desired by the chosen operational mode of the transmission. The action of the rotation retardation pistons is synchronized by a series of valves in the hydraulic system which are responsive to the rotation of the cage. This first hydraulic system also includes a selectable valve which controls the fluid circuit to either lock the cage in low gear, permit it to rotate freely in neutral or to permit only forward rotation in high or at intermediate gears.

The present invention also includes a second hydraulic circuit which is a closed circuit for controlling the rotation of the planetary gear shafts. Each planetary gear shaft has affixed to it a cog gear having a cam surface about is periphery. Rotation retardation cylinders house pistons with piston rods which engage the cam surface of the cog gears. A flow regulating valve is provided in the closed circuit to regulate the amount of flow in the circuit and thus to regulate the back pressure exerted on the pistons of the rotation retardation cylinders. When the valve is completely opened the cog gears are allowed to rotate freely in neutral or low gear. When the flow regulating valve is completely closed the cog gears are locked for high gear. The rotation of the cog gears will be controlled between these two extremes depending upon the amount that the flow regulating valve is open for the intermediate gear ratios. The effect of retarding the rotation of the cog gears is to provide an intermediate gear ratio equivalent to the sum of the high gear torque augmented by a selected low gear torque.

A pump is also provided for delivering hydraulic fluid under pressure to operate the rotation retardation cylinders for the cage.

DESCRIPTION OF THE DRAWINGS

Other features and advantages of this invention will be apparent from the following description of certain embodiments thereof taken in conjunction with the following drawings wherein:

FIG. 1 shows a cross sectional view of the gear box of the transmission of the present invention;

FIG. 2 shows a front view of the gear box taken along line II—II in FIG. 1 together with a schematic representation of the hydraulic circuit for the rotation retardation pistons for the cage;

FIG. 3 shows a schematic representation of the pump used in connection with the present invention together with a schematic representation in the accompanying hydraulic system for one of the rotation retardation cylinders for the cage; and, FIG. 4 shows a schematic representation of a second hydraulic circuit used in the present invention.

DETAILED DESCRIPTION OF THE PREFERRED EMBODIMENT

Referring now to FIG. 1, there is shown a gear box generally designed as 10 having a generally rectangular central portion 12 and two end covers 14 and 16. An oil level is maintained within the gear box to ensure antifriction rotation. A crank shaft 18 from the motor (not shown) is journaled through front cover 14 by means of a combination antifriction bearing and oil pressure seal 20. Drive shaft 22 is journaled through rear cover 16 by means of a combination antifriction bearing and oil pressure seal 24.

A cage 30 is supported for rotation within central portion 12 of gear box 10. Cage 30 includes a hub 32 into one side of which is journaled the end of drive shaft 18 by means of a combination antifriction bearing and oil pressure seal 34. The end of drift shaft 22 is journaled into the other side of hub 32 by means of a combination antifriction bearing an oil pressure seal 36. The hub 32 supports a generally circular web 38 extending radially from the hub. Web 38 extends completely across the hub 32 of cage 30 to segregate the cavities into which shafts 18 and 22 are journaled. A generally cylindrical rim 40 extends from the circumference of web 38 in a direction generaly perpendicular to the web. The outer circumferential surface 42 of rim 40 is tapered to accommodate a set of roller bearings 44 by which cage 30 is rotatably mounted inside gear box 10.

A generally cylindrical bearing support 46 is disposed on the inside of central portion 12 of gear box 10 generally coaxially with crank shaft 18 and drive shaft 22. Bearing support 46 has a bearing support suface 48 which is tapered to correspond to the taper of outer circumferential surface 42 of rim 40. Roller bearings 44 are supported between the confronting surfaces 42 and 48 to rotatably mount cage 30 within gear box 10. The end of bearing support 46 closest to front end cover 14 of the gear box 10 has a circumferential flange 49 extending radially inward for retaining roller bearings 44 in position. An annular retaining ring 50 is disposed across the end of bearing support surface 46 closest to end cover 16 of gear box 10 to hold roller bearings 44 in place by means of annular retention ring recess 51.

Gear box 10 houses a first gear set 60 and a second gear set 70. The first gear set 60 includes a pinion gear 62 fixed to crank shaft 18, and two planetary gears 64 and 66 each of which mesh with pinion gear 62. The radius of planetary gears 64 and 66 are equal to one another and both are greater than the radius of pinion gear 62.

Second gear set 70 includes a pinion gear 72 fixed to drive shaft 22 and two planetary gears 74 and 76 which mesh with pinion gear 72. The radius of planetary gears 74 and 76 are equal to one another and are both leas than the radius of pinion gear 72.

Corresponding planetary gears 64 and 74 are both fixed on a planetary gear shaft 80. Corresponding planetary gears 66 and 76 are both fixed on a planetary gear shaft 82. To allow for installation or disassembly, fixing of said gears to said shafts 80 and 82 could be achieved by splines or other suitable means. An arm 84 depends radially inward from the edge of rim 40 removed from web 38. A second arm 86 depends radially inward from the edge of rim 40 removed from web 38. Gear shaft 80 is supported for rotation between arm 84 and web 38 generally parallel to the axis of crank shaft 18 and drive shaft 22 by means of an antifriction bearing 88 mounted near the inner end of radially depending arm 84 and by means of antifriction bearing 90 mounted in web 38. Planetary gear shaft 82 is similarly mounted between arm 86 and web 38 by means of antifrictionbearing 92 mounted in web 38 to permit shaft 82 to rotate about an axis parallel to the axes of crank shaft 18 and drive shaft 22.

In this preferred embodiment each gear set 60 and 70 has only two planetary gears and planetary gear shafts 80 and 82 are disposed 180° from each other about hub 32. If it is desired, it is possible to provide three, four or more planetary gears for each pinion gear 62 or 72 and these could be equiangularly spaced about hub 32 by means of additional planetary gear shafts like 80 and 82 and additional support arms like 84 and 86.

Planetary gear sets 60 and 70, supported by means of gear shafts 80 and 82 on cage 30, provide a constant mesh drive between crank shaft 18 and drive shaft 22. No fluid coupling is used. When the transmission is in low gear, cage 30 is held fixed and the low gear ratio is dictated by the relative radii of the gears of the planetary gear sets 60 amd 70. High gear is achieved by preventing planetary gear shafts 80 and 82 from rotating about their axes and permitting cage 30 to rotate freely in the same direction as shaft 18 just as though crank shaft 18 and drive shaft 22 were rigidly connected together. An infinite variety of intermediate gear ratios can be obtained by controlling the rotation of gear shafts 80 and 82 about their axes. In the present invention separate means are provided for controlling the rotation of the cage 30 nd for controlling the rotation of planetary gear shafts 80 and 82. These systems will now be discussed starting with the system for controlling the cage.

Referring now to FIG. 2, there is shown a front end view of gear box 10 with front end cover 14 removed and including a schematic illustration of the hydraulic system used in controlling the rotation of cage 30. Cage 30 includes a peripheral, periodically repeating cam surface 100 extending radially outward from rim 40 near the end remote from web 38. This is preferably a sinusoidal cam surface. Rotation retardation cylinders 102, 104, 106 and 108 are mounted in the corners of bearing support member 46. Each one of retardation cylinders 102, 104, 106 and 108 has a piston rod 110 extending generally radially toward the axis of rotation of cage 30 and supports a roller 112 which rollably engages cam surface 100. Each of the rollers engages the generally sinusoidal cam surface 100.

The roller 112 corresponding to cylinder 102 engages cam surface 100 at a trough. The roller corresponding to cylinder 104 engages cam surface 100 at a point corresponding to a whole number of pitches from the position of cylinder 102 plus 45° approximately half way between a trough and a crest. The roller corresponding to piston 106 engages cam surface 100 at a point a whole number of pitches from cylinder 102 plus 135° at a point between a crest and a trough. The roller corresponding to cylindr 108 engages cam surface 100 at a point a whole number of pitches from the point where cylinder 102 engages the cam surface plus 90° or at a crest. It can be seen that if the piston rods 110 are locked it will not be possible for cage 30 to rotate in either direction. On the other hand, if piston rods 110 are free to reciprocate in and out of their respective cylinders 102, 104, 106 and 108, cage 30 can rotate freely in either direction. If the reciprocating motion of piston rods 110 is slightly retarded in a synchronized fashion, cage 30 will be permitted to rotate only in one direction.

The hydraulic system associated with retardation cylinders 102, 104, 106 and 108 for controlling the rotation of cage 30 will now be described. A pump 120 which operates by means of a vacuum, for example, from the engine intake manifold (not shown) provides hydraulic fluid under pressure to the retardation cylinders 102, 104, 106 and 108. The operation of pump 120 will be described in more detail in connection with FIG. 3. Pump 120 is connected to each one of retardation cylinders 102, 104, 106 and 108 in parallel by means of hydraulic pressure line 124. Retardaton cylinder 102 has a cam operated valve 128 connected in series with the outlet from cylinder 102. The outlet of each cylinder 102, 104, 106 and 108 has a one-way valve 109 to prevent fluid from entering a cylinder by its outlet. A return line 130 is connected between the outlet of each rotation retardation cylinder 102, 104, 106 and 108 through each outlet valve 128 and to the first port 132 of a three-way valve 140. The second port 134 of three-way valve 140 is connected between the outlet of each retardation cylinder 102, 104, 106 and 108 and a third port 136 of three-way valve 140. One surge tank 138 is connected to return line 131 to account for the incompressibility of liquid, the movement of valves 126 and 128, and the initial movement of retardation cylinders 102, 104, 106 and 108.

Inlet cam valve 126 and outlet cam valve 128 are synchronized to open and close in response to the rotation of cage 30. This synchronization is accomplished as follows. Gear teeth 150 are disposed around the periphery of rim 40 on the edge remote from web 38 facing front end cover 14. A pinion gear 152 attached to a shaft 154 engages gear 150 to cause shaft 154 to rotate as cage 30 rotates. Gears 150 and 152 are chosen so that shaft 154 rotates one full revolution for each pitch of the generally sinusoidal cam surface 100 on cage 30. As shown in FIG. 3, inlet cam valve 126 is biased open by means of a spring 156. Cam 158, disposed inside valve 126, opens and closes the valve as it rotates. A suitable linkage (not shown) is provided between cam gear shaft 154 and cam 158. The surface of cam 158 is chosen so that valve 126 will be open during approximately one-half of a revolution of cam 158 and will be closed for the remaining half of the revolution of cam 158. Since cam 158 like cam shaft 154 rotates one full turn for each pitch of cam surface 100 on cage 30 then valve 126 is open for one-half of the pitch of cam surface 100 and closed for one-half of the pitch of cam surface 100. It may also be seen from FIG. 3 that outlet cam valve 128 operates in the same manner as inlet valve 126 but that it is 180° out of phase with inlet cam valve 126. Outlet cam valve 128 has a cam 160 similar to cam 158. Cam 160 may be driven through a suitable linkage through the same cam gear shaft 154 that drives cam 158 or it may be separately driven by its own separate cam gear shaft and pinion gear similar to shaft 154 and pinion gear 152.

Returning again to FIG. 2, each rotation retardation cylinder 102, 104, 106 and 108 has its own set of inlet and outlet cam valves like inlet valve 26 and outlet valve 128 and each is operated in the same manner as inlet valve 126 and outlet valve 128. Thus, the operation of each inlet and outlet cam valve 126 and 128 is synchronized to the rotation of cage 30.

Depending upon the position of three-way valve 140, the hydraulic circuit will operate to lock cage 30, to permit cage 30 to rotate freely in either direction, or to permit rotation in only one direction. The position of three-way valve 140 for operating the transmission in high gear will now be described. It can be seen that when three-way valve 140 is connected, as shownin FIG. 2, between its first port 132 and its second port 134, line 131 between the outlet of rotation retardation cylinder 102 and the third port 136 of valve 140 will be blocked so that hydraulic fluid will have to return to pump 120 through outlet cam valve 128 and hydraulic line 130. In this position the action of inlet and outlet cam valves 126 and 128 is synchronized to permit rotaton of cage 30 only in the same direction as crank shaft 18, i.e., clockwise as shown in FIG. 2. Inlet cam valve 126 is synchronized to open and permit hydraulic fluid into rotation retardation cylinder 102, as piston rod 110 extends and roller 112 rolls from a crest toward a trough of cam surface 100. As can be seen in FIG. 3, a roller gasket provides a seal for the piston in cylinder 102. When roller 112 reaches the trough, inlet cam valve 126 is closed and remains closed for the next half pitch of cam surface 100. With thethree-way valve 140 connected between its first port 132 and its second port 134 as shown in FIGS. 2 and 3, the piston rod 110 will be permitted to recede into cylinder 102 as roller 112 rides up from the trough to the next crest and hydraulic fluid will be directed out of cylinder 102 toward three-way valve 140 through outlet cam valve 128. Cam valve 128 is synchronized so that it is 180° out of phase with inlet cam valve 126 and will open just as cam valve 126 closes to permit hydraulic fluid to pass through outlet cam valve 128 to three-way valve 140. It will be noted that when the threeway valve 140 is connected between its first and second ports 132 and 134 that when inlet cam valve 126 is opened to permit hydraulic fluid to flow into cylinder 102, outlet cam valve 128 is closed so that the hydraulic fluid must be directed into cylinder 102 to extend piston rod 110. Since outlet valve 128 is closed the full pump pressure is exerted on the piston. Thus piston rod 110 will resist receding into cylinder 102 and prevent cage 30 from reversing its direction of rotation.

In FIG. 2 this is particularly apparent with respect to retardation cylinder 106 whose corresponding roller is shown in its position as it travels from a crest toward a trough as the cage rotates clockwise. As cylinder 106 is being charged with pressure from pump 120, this full pump pressure would resist any tendency of the piston rod for cylinder 106 to recede into the cylinder if cage 30 were to try to reverse direction. As will be explained more fully subsequently, it is important to prevent cage 30 from reversing its direction when the transmission is set at an intermediate gear ratio between high gear and low gear, or at high gear.

Still referring to FIG. 2, the position of three-way valve 140 will now be described for operating the transmission in low gear. When three-way valve 140 is rotated 45° counterclockwise effectively blocking ports 134 and 136, the return to pump 120 will be blocked because return lines 131 and 130 will be discontinuous beyond three-way valve 140 and will form a closed loop providing a hydraulic lock on each rotation retardation cylinder 102, 104, 106 and 108. Thus, cage 30 will not be permitted to rotate in either direction. In low gear, crank shaft 18 directly drives pinion 62 which in turn drives planet gears 64 and 66 which through planetary gear shafts 80 and 82 drive planetary gears 74 and 76 which in turn drive pinion gear 72 which is fixed to output shaft 22. Thus, the low gear ratio will be determined by the relative dimensions of the two planetary gear sets 60 and 70.

When three-way valve 140 is connected between ports 136 and 134, return line 130 will be blocked and return line 131 is connected directly to the reservoir of pump 120 so that outlet cam valve 128 is by-passed. Thus, rotation retardation cylinders 102, 104, 106 and 108 reciprocate freely and provide no retardation force on cage 30. This corresponds to the neutral position where output shaft 22 does not rotate. Crank shaft 18 will drive pinion gear 62 which drives planetary gears 64 and 66 which in turn, through shafts 80 and 82, drives planetary gears 74 and 76 to rotate around pinion gear 72 which does not rotate. Thus, if crank shaft 18 rotates clockwise cage 30 will freely rotate counterclockwise.

Referring again to FIG. 3, pump 120 that is used in association with the transmission of the present invention will now be described. Pump 120 preferably includes a generally cylindrical reservoir housing 200 vented to the atmosphere through vent 202. Housing 200 is divided into an upper chamber 204 and a lower chamber 206 by a rigid diaphragm 208 resiliently connected to the inside of reservoir housing 200 by means of an elastic bellow 210 which has a force provided by spring 239 tending to maintain rigid diaphragm 208 in a neutral upward position. An opening 212 in the center of rigid diaphragm 208 is flexibly connected to a pump outlet conduit 214 by means of a bellow type coupling 216. Conduit 214 connects with line 124 of the hydraulic circuit shown in FIG. 2. A check valve 218 is disposed in outlet conduit 214 to permit flow only in one direction out of pump 120 in response to a predetermined pump pressure level. In the description that follows, it will be apparent that the quantity of fluid that will be pumped under pressure will be that residing in the bellows-type coupling 216 between opening 212 and check valve 218.

A generally cylindrical, rigid outer pump housing 220 is supported within chamber 204 by means of rigid struts 222. One end of pump housing 220 is flexibly connected by means of a bellows-type coupling 224 to rigid diaphragm 208. The end of pump housing 220 remote from rigid diaphragm 208 is closed by a plate 226 which has an opening 228 to accommodate a conduit 230 which communicates with a vacuum source such as the intake manifold (not shown) of the engine.

An inner pump housing 232 having a generally cylindrical shape with a diameter less than the diameter of the outer pump housing is rigidly attached to diaphragm 208. A flexible coupling 238 connects top 236 of inner housing 232 to the outer housing 220 in the vicinity of the periphery of plate 226. The space defined by the confronting surfaces of top 236 of inner housing 232 and plate 226 of outer housing 220 and flexible coupling 238 form a variable volume pneumatic chamber 240 which communicates with conduit 230. The circumferential space 241 is effectively sealed off by flexible coupling 238 from having vacuum entering it. Thus, the rigid diaphragm 208 and the variable volume in chamber 240 provides a pumping action.

Upper chamber 204 is filled with hydraulic fluid to a level completely covering outer pump housing 220. An inlet check valve 244 is mounted on outer housing 220 and is connected by means of a flexible conduit 246 through inner housing 232 to permit hydraulic fluid to enter into volume chamber 242 as vacuum is introduced to variable volume pneumatic chamber 240, as described below, for the upward movement of inner pump housing 232.

Low chamber 206 is connected directly to a vacuum source such as the engine intake manifold (not shown) by means of a vacuum conduit 248.

As previously described, vacuum conduit 230 connects vacuum chamber 240 to the same vacuum source. A valve 250 is connected in conduit 230 in fluid communication between a vacuum source and chamber 240 to alternately provide a vacuum or atmospheric pressure in conduit 230. Valve 250 has a generally cylindrical upper housing 400 enclosing chamber 402 which is in fluid communication with the vacuum source. Valve 250 also has a generally cylindrical lower housing 404 enclosing a chamber 406. The diameter of housing 400 is greater than that of housing 404. The bottom of housing 400 supports a peripheral flange 408 into which housing 404 fits. Threads on the confronting surfaces of flange 408 and housing 404 threadably connect housings 400 and 404 together. The bottom of housing 400 has an opening 410 which provides fluid communication between chambers 402 and 406. Chamber 406 communicates with the atmosphere through opening 412. A flange 414 surrounding opening 412 and affixed to housing 404 supports an air filter 416 for preventing foreign matter from entering valve 250. Chamber 406 communicates with conduit 230 through opening 418 in housing 404.

Valve 250 has a valve stem 422 which operates to alternately provide a vacuum or atmospheric pressure in conduit 230. A valve stem 422 is supported for motion along its axis inside chamber 402 by means of a sleeve 424 which is centrally supported over opening 410 by means of struts 426 extending between sleeve 424 and the inside wall of housing 400. Valve stem 422 projects through openings 410 and 412 and supports discs 428 and 430.

Disc 428, having a diameter greater than the diameter of opening 410, is fixed to stem 422 in chamber 406 confronting opening 410. A second disc 430, having a diameter greater than opening 412 is slidably mounted on stem 422 below disc 428. Retainer 432 on the end of stem 422 prevents disc 430 from sliding off stem 422. Compression spring 434 biases discs 428 and 430 apart. A bellows type gasket 436 is affixed around the periphery of opening 410 on the bottom of housing 400 and projects toward disc 428. The diameter of gasket 436 is less than the diameter of disc 428 so that the free end of gasket 436 can contact the confronting surface of disc 428. Gasket 438 is disposed around the periphery of opening 412 on the inside of chamber 406. Valve stem 422 is operated by a cam 440 located at the top of stem 422 in chamber 402. Cam 440 is driven by crank shaft 18 through a suitable linkage (not shown).

Valve 250 operates to alternately provide a vacuum and atmospheric pressure in conduit 230 in the following manner. When cam 440 is in the position shown in FIG. 3, disc 428 closes tightly against and compresses bellows type gasket 436 to isolate chamber 402 from chamber 406. The vacuum present in chamber 402 will draw disc 428 together against bellows type gasket 436. Since disc 428 is fixed to stem 422, stem 422 will also move upward engaging retainer 432 against disc 430 and lifting disc 430 away from gasket 438 to permit atmospheric pressure to enter chamber 406 and conduit 230. As disc 428 moves up with stem 422 compression spring 434 relaxes to release disc 430 and permit atmospheric pressure to lift disc 430. As cam 440 rotates clockwise, it will force valve stem 422 down moving disc 428 down and relaxing bellows type gasket 436. As disc 428 moves down it will compress spring 432 and close disc 430 against gaskets 438 to close opening 412. Valve stem 422 will move down further as cam 440 continues to turn moving disc 428 down further until it separates from bellows type gasket 436 and introduces a vacuum into chamber 406. The force exerted by compression spring 434 in this position of disc 428 is strong enough to hold disc 430 tightly closed over opening 412. Atmospheric pressure in chamber 406 and conduit 230 will exhaust through chamber 402. As cam 440 continues to rotate, valve stem 422 will be urged upward by the force of compression spring 434 acting against disc 428. Disc 428 will move up and contact bellows type gasket 436, again isolating chamber 402 from chamber 406. The force exerted on disc 430 by spring 434 will decrease as stem 422 moves up so that atmospheric pressure acting on the outside of disc 430 will tend to urge disc 430 away from gasket 438 and open opening 412 to allow atmospheric pressure into chamber 406. The atmospheric pressure acting against disc 428 will tightly close disc 428 against bellows type gasket 436 and urge valve stem 422 against cam 440. Now atmospheric pressure will be present in chamber 406 and conduit 230. This valve 250 alternately provides vacuum and atmospheric pressure in conduit 230 for operating pump 120.

Pump 120 operates as follows. A vacuum is always present in lower chamber 206. Hydraulic fluid under atmospheric pressure in upper chamber 204 fills volume chamber 242 through one-way valve 244 and when disc 430 is opened, creates a hydrostatic pressure which tends to depress rigid diaphragm 208. When cam valve 250 opens, a vacuum is established in conduit 230, as previously described, and vacuum chamber 240 so that top 236 of inner pump housing 232 will tend to move upward reducing the pressure in volume chamber 242. Hydraulic fluid will enter volume chamber 242 through check valve 244. When cam valve 250 closes, atmospheric pressure will be established in conduit 230 and correspondingly in vacuum chamber 240 so that top 236 of inner pump housing 232 will move down, closing check valve 244 and opening check valve 218 forcing hydraulic fluid out of chamber 245 formed within bellow type coupling 216 and out of the pump through conduit 214.

When cam valve 250 opens, a vacuum is established in conduit 230 and in vacuum chamber 240. These opposing vacuums on diaphragm 208, acting on the planar area of outer housing 220, neutralize each other and allow spring 239 to bias diaphragm 208 upward. This upward movement of diaphragm 208 causes a reduction of volume in chamber 240 and allows hydraulic fluid to be drawn into volume chamber 242, through valve 244, of an amount equal to that caused by the above-described pump action. The hydrostatic pressure acting against outlet check valve 218 thus depends on the vertical distance between top 236 and check valve 218 through chambers 242 and 245 formed by the bellows type gasket 216. When atmospheric pressure is again introduced into conduit 230 and chamber 240, top 236 will start down closing check valve 244 and forcing diaphragm 208 down against elastic bellows 210 and collapsing bellows-type coupling 216. When bellows type coupling 216 is fully collapsed valve 250 will actuate and introduce a vacuum into conduit 230 again. The quantity of hydraulic fluid that will be pumped from pump 120 in a single cycle will be the quantity contained in bellows type coupling 216 when top 236 and rigid diaphragm 208 are all the way up. The volume of hydraulic fluid pumped will be greater than or equal to the volume of one of the rotation retardation cylinders, i.e., cylinder 102. It can be seen that pump 120 is controlled by engine manifold vacuum pressure and by the hydrostatic pressure variations in chamber 242. Thus, the hydraulic system for controlling the rotation of cage 30 is a relatively low pressure and low volume system which is capable of efficient and low maintenance operation. It can also be seen that the pressure level at which pump 120 operates and the volume of hydraulic fluid pumped can be varied by adjusting the relative diameters of inner pump housing 232 and reservoir housing 200 and by adjusting the height of inner pump housing 232 and reservoir housing 200 and by adjusting the height of inner pump housing 232 and by adjusting the size of volume 245 formed by the bellows type coupling 216.

A surge tank 300 is shown in FIG. 3 attached to the bottom of reservoir housing 200. A quantity of hydraulic fluid is stored in the surge tank and outlet 302 from outlet conduit 214 communicates directly with the interior of surge tank 300. A toroidal shaped, flexible rubber membrane 304 encloses air captured under pressure. To prevent rupture from excessive oil pressure build up, an oil return line 305 with a pressure relief valve 307 has been provided to communicate between storage/surge tank 300 and oil reservoir 204. The expansion and contraction of membrane 304 regulate the pressure in surge tank 300 to a substantially constant value. Alternatively, surge tank 300 may be a separate tank not connected to reservoir housing 200. If desired, an oil pressure gauge may be inserted in surge tank 300 to provide a means for activating a warning light indicating low pressure in the surge tank in order to warn the operator when hydraulic pressure in the system drops below the required level. Outlet conduit 214 is connected directly to conduit 124 as shown in FIG. 2.

The hydraulic system for controlling the rotation of planetary gear shafts 80 and 82 will now be described in conjunction with FIGS. 1, 2 and 4. In FIG. 1 cog gears 320 and 322 are shown affixed respectively to planetary gear shafts 80 and 82 in a position between web 38 and planetary gears 74, 76 respectively so that the cog gears 320 and 322 rotate together with shafts 80 and 82. Referring to FIG. 2, rotation retardation cylinders 324 and 326 are mounted on a circular circumference on the side of web 38 facing end cover 16 of gear box 10. Referring now to FIG. 4, cylinders 324 and 326 have piston rods 328 and 330, respectively, which in turn support rollers 332 and 334, respectively, which engage a cam surface 336 on cog gear 322. Cam surface 336 has a generally sinusoidal configuration with roller 334 contacting surface 336 at a crest and roller 332 contacting surface 336 at a trough. Additional rotation retardation cylinders 340 and 342 are similarly placed on the same side of web 38 and include similar piston rods 344 and 346 which support similar rollers 348 and 350 which engage a similar sinusoidal cam surface 352 on cog gear 320 but at positions of one-quarter and three-quarter of the pitch dimension of the cam cog respectively. Each cylinder 324, 326, 342 and 340, has a one-way valve 343 in series with its inlet to prevent hydraulic fluid from reversing direction as it circulates through the closed system. To keep the hydraulic fluid in this system cool, it may be circulated through conventional cooling means like the radiator of the automobile in which the transmission is mounted.

Referring again to FIG. 1, the conduit for conveying hydraulic fluid to rotation retardation pistons 324, 326, 340 and 342 will now be described. Conduit 360 communicates with the housing of bearing 20 through which crank shaft 18 is journaled into front end cover 14 of gear box 10. A portion of crank shaft 18 between bearing 20 and hub 32 of cage 30, has a hollow channel 362. Channel 362 provides fluid communication between conduit 360 and a hollow chamber 364 in one side of hub 32. As shown best in FIG. 2, hydraulic distribution lines 366, 368, 370 and 372 communicated between chamber 364 and rotation retardation cylinders 324, 326, 342 and 340, respectively, to provide a means for delivering hydraulic fluid to these rotation retardation cylinders.

Hydraulic return lines 374, 376, 378 and 380 return hydraulic fluid from rotation retardation cylinders 324, 326, 342, and 340, respectively to a second chamber 365 in hub 32 which is isolated from chamber 364 by web 38. Return lines 374, 376, 378 and 380 pass through web 38 at points 381.

The portion of drive shaft 22 between bearing 36 and in hub 32 and bearing 24 by which shaft 22 is journaled through end cover 16 of gear box 10 has a hollow channel 382 to provide fluid communication between chamber 365 and the housing of bearing 24.

Return conduit 384 provides fluid communication from the housing for bearing 24. Thus, fluid communication through gear box 10 is provided as the hydraulic fluid enters through conduit 360 into the housing of bearing 20 into channel 362 of crank shaft 18 and into chamber 362 in hub 32, out through distribution lines 366, 368, 370 and 372 to rotation retardation cylinders 324, 326, 342 and 340, respectively, back through return lines 374, 376, 378 and 380 into chamber 365 in the other side of hub 32, out through channel 382 in drive shaft 22 into the housing of bearing 24 and out through return conduit 384. Suitable oil seals are provided at the points where the crank shaft 18 and drive shaft 22 are journaled through covers 14 and 16 respectively and hub 32.

Referring now to FIG. 4, a throttling valve 390 is in fluid communication with conduit 384 to receive hydraulic fluid. Valve 390 may be varied between a fully open and a fully closed position through an infinite number of intermediate positions. The shaded depictions 391 shows the extent the valve 390 is being closed for the intermediate gear ratios. The outlet 394 of throttling valve 390 is in fluid communicated with conduit 360. Valve 390 completes a closed hydraulic system for controlling the motion of the piston rods 328, 330, 346 and 344 of rotation retardation cylinders 324, 326, 342 an 340, respectively.

When the throttling valve 390 is in the fully opened position, the fluid will circulate freely through the closed system to permit cog gears 320 and 322 to rotate freely. The fully open position is required for the neutral position of the transmission when shaft 22 does not rotate and cage 30 rotates backwards, i.e., in the direction opposite to the crank shaft 18. Throttling valve 390 is also fully open in low gear, when cage 30 is locked in position. When the transmission is in the high gear position valve 390 is fully closed locking cog gears 320 and 322 so that crank shaft 18 and drive shaft 22 will rotate at the same speed and cage 30 rotates in the same direction as the crank shaft 18. Locking cog gears 320 and 322 have the effect of locking the planetary gears to their respective pinion gears so that they turn as a unit and cog gears do not rotate with respect to the pinion gears.

At the intermediate positions of throttle valve 390, the rotation of the cog gears 320 and 322 is retarded so as to provide an intermediate gear ratio between low and high. Thus, it can be seen that the hydraulic system for controlling the rotation of planetary gear shafts 80 and 82 is also a low volume system capable of efficient and low maintenance operation.

The manual operation of the transmission will now be explained, for neutral, low, high and a representative intermediate gear, between high and low.

For operating the transmission in neutral, crank shaft 18 turns in the clockwise direction at the speed dictated by the engine. Cam valve 250 whose cam 440 is linked to crank shaft 18 by a linkage (not shown) will rotate and open valve 250 introducing the vacuum into conduit 230. The top 236 of inner pump housing 232 will move up drawing hydraulic fluid into volume chamber 242 through inlet check valve 244. Diaphragm 208 will then move up under the influence of the bias spring 239. When cam valve 428 closes under the influence of cam 440, atmospheric pressure is introduced into chamber 240 moving inner pump housing 232 down, closing inlet check valve 244 and opening outlet check valve 218, forcing fluid out of pump 120 through outlet conduit 214 and into conduit 124 to introduce hydraulic fluid into rotation retardation cylinders 102, 104, 106 and 108. Three way valve 140 will be connected between ports 134 and 136 so that hydraulic fluid returning from rotation retardation cylinders 102, 104, 106 and 108 will return through return line 131 to reservoir 204 completely by-passing outlet cam valve 128 so that cage 30 will be permitted to rotate freely in the counterclockwise direction and piston rods 110 will ride in and out of their corresponding cylinders freely and rollers 112 will ride freely along cam surface 100 of cage 30 without providing any substantial resistance to the rotation of cage 30. Throttling valve 390 will be set in the fully open position so that cog gears 320 and 322 will be permitted to rotate freely without being impeded by the action of rotation retardation cylinders 324, 326, 342 and 340. Crank shaft 18 will rotate at a specified RPM in the clockwise direction and correspondingly rotate pinion gear 62 of planetary gear set 60 in a clockwise direction. This rotation of pinion gear 62 will cause planetary gears 64 and 66 to rotate in the counterclockwise direction and rotate planetary gear shafts 80 and 82 to which they are respectively affixed. Shafts 80 and 82 will correspondingly rotate the planetary gears 74 and 76 to which they are respectively affixed and turn cog gears 320 and 322. Pinion gear 72 of gear set 70 and drive shaft 22 to which it is affixed will remain stationary so that planetary gears 74 and 76 will walk around the circumference of pinion gear 72 causing planetary gear shafts 80 and 82 to likewise walk around pinion gear 72 turning cage 30 with it so that it rotates counterclockwise by means of roller bearings 44 in the central portion 12 of the gear box 10.

As cage 30 rotates gear teeth 150 will rotate and turn pinion 152 to rotate shaft 154 and correspondingly rotate cam 158 and open and close inlet cam valves 126 to permit hydraulic fluid under pressure to enter rotation retardation cylinders 102, 104, 106 and 108. However, since outlet cam valve 128 is by-passed by three position valve 140 there will be no retardation effect produced on cam surface 100 of cage 30.

In the low gear position, cage 30 is held stationary and three-way valve 140 is rotated 45° counterclockwise to effectively block off ports 136 and 134 so that return lines 131 and 130 from each rotation retardation cylinder 102, 104, 106 and 108 provide a closed loop locking piston rods 110 and rollers 112 into engagement with cam surface 100 of cage 30 to prevent the rotation of cage 30. Pinion gear 152 will not move with respect to the gear teeth 150 on the periphery of cage 30 so that inlet cam valves 126 will stay closed and provide a fluid lock in rotation retardation cylinders 102, 104, 106 and 108. Throttling valve 290 will be completely open so that cog gears 320 and 322 may rotate freely without any retardation from cylinders 324, 326, 342 or 340. Thus, in low gear, drive shaft 18 will rotate in a clockwise direction correspondingly driving pinion gear 62 which will in turn drive planetary gears 64 and 66 in a counterclockwise direction turning pinion shafts 80 and 82 counterclockwise. Planetary gears 74 and 76 of gear set 70 which is affixed to planetary gear shafts 80 and 82, respectively, will also turn counterclockwise and drive pinion gears 72, with which they mesh, in a clockwise direction. Pinion gear 72 is fixed to shafts 22 so shafts 22 will be driven in a clockwise direction at a lower speed than input shaft 18. The gear ratio of the transmission in the low positon will be determined by the relative radii of the gears in gear sets 60 and 70.

In high gear, the rotation of crank shaft 18 and drive shaft 22 are the same. This is achieved by locking cog gears 320 and 322 and permitting cage 30 to rotate in the same direction as shaft 18 but prohibiting cage 30 from rotating backwards. Three-way valve 140 will be connected between ports 132 and 134 thus requiring hydraulic fluid from the rotation retardation cylinders 102, 104, 106 and 108 to return through line 130 and return cam valve 128. As previously explained, inlet and outlet cam valves 126 and 128 are synchronized to the rotation of cage 30 by means of gear 150 on the surface of cage 30 and pinion 152 which drives shaft 154 to operate inlet cam valve 126 through suitable linkage (not shown).

Outlet cam valve 128 may be operated from the same shaft 154 through a suitable linkage (not shown) or outlet cam valve 128 may be operated through a separate shaft operated in the same way as shaft 154. Inlet and outlet cam valves 126 and 128 are synchronized to the motion of cage 30 and synchronized 180° out of phase with each other. The purpose of this synchronization is to provide a force against cam surface 100 which will prevent cage 30 from rotating counterclockwise but which will permit it to freely rotate in a clockwise direction. Crank shaft 18 rotates clockwise at the RPM designated by the engine and drives pinion gear 62 corresponding to the clockwise direction. Since cog gears 320 and 322 are locked, planetary gear shafts 80 and 82 will not rotate about their own axes and thus planetary gears 64 and 66 will not rotate about their own axes. Thus, pinion gear 62 will be locked to planetary gears 64 and 66 and the entire planetary gear set 60 will rotate together driving cage 30 clockwise at the same speed as crank shaft 18. Correspondingly, planetary gears 74 and 76 of gear set 70 will be locked to pinion gear 72 so that pinion gear 72 and shaft 22 which is fixed to pinion gear 72 will rotate in the clockwise direction at the same speed as shaft 18 as if shafts 18 and 22 were rigidly connected together.

In an intermediate gear ratio three-position valve 140 is connected between ports 132 and 134 just as it is for the high gear position and cage 30 is similarly permitted to rotate clockwise freely, but the counterclockwise rotation of cage 30 is prevented by the synchronized action of rotation retardation cylinders 102, 104, 106 and 108 as it was with the high gear position. Throttling valve 390 will be placed in a position between high and low so that the flow through rotation retardation cylinders 324, 326, 342 and 340 will be retarded and consequently the rotation of cog gears 320 and 322 will be retarded. The effect of retarding cog gears 320 and 322 and thus retarding the rotation of planetary gear shafts 80 and 82 is to provide an intermediate gear ratio equivalent to the sum of the high gear torque augmented by a selected low gear torque. This is equivalent to applying an additional force to pinion gear 72 of planetary gear set 70.

The operation of the transmission has been described for a manual setting of three-way valve 140 and throttling valve 390. The present transmission is also capable of automatic operation. Of course, the position of the three-way valve 140 corresponding to the neutral position of the transmission would always be manually set as it is in conventional automatic transmission. This is also true of the position of three-way valve 140 for the low position. Under normal driving conditions the shift lever for three-way valve 140 would be set at the position corresponding to the high gear position and the intermediate gear ratio position. That is, with valve 140 connected between ports 132 and 134. This permits cage 30 to rotate freely in a clockwise direction but prevents the counterclockwise or backwards rotation of cage 30 through the synchronized action of rotation retardation cylinders 102, 104, 106 and 108. For automatic operation valve 390 could be positioned by servomotors driven by a computer means in which was stored certain performance characteristics and logic of the engine. The speed of crank shaft 18 and drive shaft 22 is monitored, for example, by means of a magnetic sensor 500 which includes a strip of magnetic tape 502 attached to each shaft. Each sensor 500 is connected to a counter 504 which counts the number of times strip 502 passes the sensor in a predetermined time interval to determine shaft revolutions per minute. Appropriate logic circuitry 506 is provided to receive the counter output and generate a signal indicative of the rate of change of RPM of each shaft 18 and 22. Sensor 510 generates an electrical signal indicative of the manifold vacuum of the engine. This signal is input to logic circuit 506. If the revolution of the drive shaft 22 and crank shafts 18 were decreasing but with a constant or increased motor manifold vacuum the logic circuitry would sense this and cause a slightly lower gear ratio to be selected. The opposite would be true, that is a tendency to a higher gear, for decreasing power demand. It is anticipated that the transmission would be locked into the high gear mode above the speed 28 m.p.h. and be returned to the intermediate mode when the speed fell below 28 m.p.h.

It will additionally be understood that very heavy trucks, etc., could couple two such transmission units together in series. The first unit would be connected to the motor's crankshaft and would be of extremely low input to output gear ratio feeding to the other unit of higher gear ratio. In this configuration, the first unit would simultaneously work with the second unit to give an extended range of low gear ratios until high gear was reached.

It will be understood that the particular embodiment of the transmission of the present invention described and disclosed above is susceptible of considerable modification without departing from the invention concept herein disclosed. Consequently, it is not intended that this invention shall be limited to the precise details disclosed but only as set forth in the following claims.

What is claimed is:

1. A constant meshed, variable gear ratio transmission comprising:
   a gear box including;
      a housing,
      input and output shafts journaled in said housing;
   a plurality of planetary gear sets in said housing coupling said shafts together and including,
      a pinion gear on each of said shafts;
      a plurality of planetary gears meshing with each said pinion gear;
   planetary gear shafts fixed to the corresponding planetary gears of each pinion;
   a cage rotatably supported in said housing and rotatably supporting said planetary gear shafts;
   first hydraulic circuit means for controlling the rotation of said cage; and,
   second independent hydraulic circuit means for controlling the rotation of said planetary gear shafts.

2. The transmission of claim 1 wherein:
   said housing includes a generally cylindrical central portion;
   a first end cover fixed to said central portion and adapted to have said input shaft journaled therethrough;
   a second end cover fixed to the other end of said central portion and adapted to have said output shaft journaled therethrough.

3. The transmission of claim 2 further including:
   a circumferential flange disposed on the inside of the central portion of said housing;
   a cylindrical surface on said cage confronting said circumferential flange;
   a roller bearings supported between said circumferential surface and said confronting cylindrical surface cooperating to provide a means for rotatably supporting said cage in said housing.

4. The transmission of claim 1 wherein each pinion has two planetary gears.

5. The transmission according to claim 1 wherein said cam surface has a sinusoidal configuration and including four cylinders affixed to said housing and spaced apart approximately one quarter of the circumference of said cage, each having a piston rod adapted to engage said sinusoidal cam surface at a different position on the repeating cam surface, wherein:
   a first piston rod engages said cam surface at a trough of said cam surface;
   a second piston rod engages said cam surface at a point spaced apart from said first piston rod a whole number of pitches of said cam surface plus approximately 45°;
   a third piston rod engages said cam surface at a point spaced apart from said first piston rod a whole number of pitches of said cam surface plus approximately 90°; and
   a fourth piston rod engages said cam surface at a point spaced apart from said first piston rod a whole number of pitches of said cam surface plus approximately 135°.

6. The transmission of claim 1 further including means for synchronizing the action of said rotation retardation of cylinders with the rotation of the cage including:
   valve means associated with each said cylinder in fluid communiction between said pumping means and said cylinder;
   second valve means associated with each said cylinder in fluid communication between said cylinder and said reservoir;
   said first and said second valve means each having a first closed position for blocking fluid communication therethrough and each having a second position for permitting fluid communication therethrough;
   means associated with each said valve means for periodically switching it between its said first and said second position responsive to the rotation of said cage; and,
   the action of said first valve means being one half period out of phase with the action of said second valve means.

7. The transmission of claim 6 wherein said switching means includes:
   a three way valve in fluid communication between each of said rotation retardation cylinders and a reservoir for controlling the return of hydraulic fluid from said cylinders to said reservoir;
   having a first position permitting fluid communication between each of said cylinders and said reservoir through said second valve means;
   having a second position for permitting fluid communication directly between each of said cylinders and said reservoir;
   having a third position for preventing fluid communication between each of said cylinders and said reservoir;
   whereby when said switch is in said third position the hydraulic fluid between said first valve and said switch will be trapped in a closed system so that said piston will be permitted to retract only a predetermined amount into said cylinder and then lock said cage against rotation.

8. The transmission of claim 1 wherein said closed hydraulic circuit includes:
   a variable position throttling valve having a first position blocking the flow through said closed circuit and trapping an amount of hydraulic fluid between said valve and said piston to prevent retraction of said piston to thereby lock said cog gear to prevent the rotation thereof; and,
   having a second position permitting free flow through said closed circuit so that said piston will move freely in said cylinder and permit the rotation of said cog gear;
   having a plurality of positions between said first and said second positions for selectively restricting the flow through said valve to amounts between said flow at said first or said second position.

9. The transmission of claim 1 wherein the means for controlling the rotation of said planetary gear shafts includes:
   means for sensing the speed of rotation of said input shaft and generating a signal indicative thereof;
   means for sensing the speed of rotation of said output shaft and generating a signal indicative of engine manifold pressure means responsive to said input shaft speed signal and said output shaft speed signal and said manifold pressure signal for generating a control signal; and,
   means responsive to said control signal for controlling the rotation of said planetary gear shafts.

10. A constant meshed, variable gear ratio transmission comprising:
    a gear box including;
      a housing,
      input and output shafts journaled in said housing;
    a plurality of planetary gear sets in said housing coupling said shafts together and including,
      a pinion gear on each of said shafts;
      a plurality of planetary gears meshing with each said pinion gear;
      planetary gear shafts connecting the corresponding planetary gears of each pinion;
    a cage rotatably supported in said housing and supporting said planetary gear shafts;
    means for controlling the rotation of said cage including:
      a cam surface disposed on said cage;
      a plurality of rotation retardation cylinders affixed to the inside of said housing and having piston rods adapted for engaging said cam surface;
      means for pumping hydraulic fluid into said cylinders from a reservoir;
      switching means for selectively determining the operational mode of said cage to selectively lock the cage, permit it to rotate freely in either direction or permit it to rotate freely in the direction of rotation of said input shaft but to prevent rotation in a direction opposite to the rotation of the input shafts; and,
    means for controlling the rotation of said planetary gear shafts.

11. A constant meshed, variable gear ratio transmission comprising:
    a gear box including;
      a housing,
      input and output shafts journaled in said housing;
    a plurality of planetary gear sets in said housing coupling said shafts together and including,
      a pinion gear on each of said shafts;
      plurality of planetary gears meshing with each said pinion gear;
      planetary gear shafts connecting the corresponding planetary gears of each pinion;
    a cage rotatably supported in said housing and suppoting said planetary gear shafts;
    means for controlling the rotation of said cage; and,
    means for controlling the rotation of said planetary gear shafts including:
      a cog gear fixed to each said planetary gear shaft and having a cam surface about the circumference thereof;
      at least one rotation retardation cylinder for each said cog gear mounted on said cage and including a piston rod for rotatably engaging said cam surface of said cog gear; and,
      a closed hydraulic circuit for controlling the motion of said piston in said cylinder.

* * * * *